(No Model.)
H. L. HEATON.
PITMAN COUPLING FOR HARVESTERS.
No. 315,940. Patented Apr. 14, 1885.
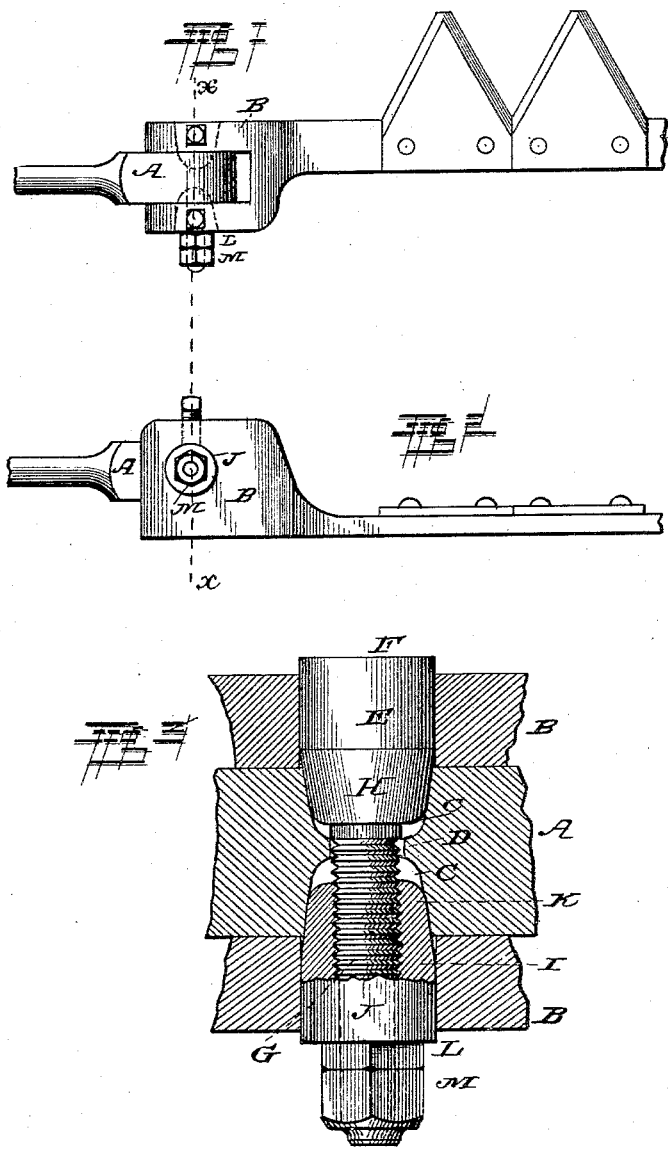
WITNESSES:
INVENTOR.
Horace L. Heaton
by Louis Bagger & Co.
ATTORNEYS.

UNITED STATES PATENT OFFICE.

HORACE L. HEATON, OF INDIANAPOLIS, INDIANA, ASSIGNOR OF ONE-HALF TO FRANK WOODBRIDGE, OF SAME PLACE.

PITMAN-COUPLING FOR HARVESTERS.

SPECIFICATION forming part of Letters Patent No. 315,940, dated April 14, 1885.

Application filed May 14, 1884. (No model.)

*To all whom it may concern:*

Be it known that I, HORACE L. HEATON, a citizen of the United States, and a resident of Indianapolis, in the county of Marion and State of Indiana, have invented certain new and useful Improvements in Pitman-Couplings for Harvesters; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of my improved coupling for pitmen or similar connections, showing it attached to a harvester-cutter. Fig. 2 is a side view of the same, and Fig. 3 is a cross-section on line $x$ $x$, Figs. 1 and 2, on an enlarged scale.

Similar letters of reference indicate corresponding parts in all the figures.

My invention has relation to couplings for pitmen, connecting-rods, or similar connections or joints in which a rotary or oscillating motion in one plane is desired; and it consists in the improved construction and combination of parts of such a coupling adapted to take up the wear of the parts, as hereinafter more fully described and claimed.

In the accompanying drawings, the letter A indicates the head of the pitman, and B the bifurcated bearings in which the said head is hinged. The perforations in the said bearings are cylindrical, while the perforation in the pitman-head consists of two truncated conical recesses, C C, having their apices meeting and slightly rounded, and separated by a perforated wall, D. A bolt, E, having its outer end, F, cylindrical, and fitting in the cylindrical bore of one of the bearings, has its reduced end G screw-threaded and passing through the perforated wall in the pitman-head, while the portion H of the bolt, which fits in the conical portion of the bore of the pitman-head, is truncate conical and slightly rounded at its apex, corresponding to the conical recess, but slightly larger in diameter, not fitting entirely to the bottom of the recess. A nut, I, having its outer end, J, cylindrical, and fitting in the cylindrical bore of the other half of the bearing, and having its inner portion, K, truncate conical and slightly rounded, corresponding in size and shape to the head of the screw-threaded bolt, fits and turns upon the threaded end of the said bolt, fitting with its conical portion in the conical recess, and two nuts, L and M, fit upon the outer end of the threaded end of the bolt, locking the cylindrical conical nut in position. It will now be seen that as the conical recesses in the pitman-head and the conical portions of the bolt and nut are worn the conical nut may be drawn farther in upon the bolt, and be held by its securing-nuts, thus taking up all wear; but by constructing the parts H and K of a truncate conical shape with rounded apex, instead of a straight bevel, as usual in this class of bearings, and constructing the conical recesses C C with rounded apices, in the manner shown more clearly in Fig. 3 of the drawings, I reduce the frictional area or wearing-surface as between the conical heads and the recesses C C, in which they work, because in tightening up the bearings to compensate for wear there will always be an open space at the inner ends of the recesses. This construction also enables me to make the conical parts H and K with but slightly inclined or beveled sides, the sides being nearly straight, which gives a better and truer bearing between the parts A and B than is the case where the parts H and K are made flaring or with a considerable incline, the frictional area being, of course, in proportion to the angle or incline of the bevel.

Having thus described my improvement, I claim and desire to secure by Letters Patent of the United States—

In a compensating journal-bearing for harvester-pitmen or similar moving parts, the combination of the pitman-head A, having truncated conical recesses C C with rounded apices, bifurcated bearings B, screw G, having a truncate conical head H with rounded apex, bearing-nut I, having a truncate conical head, K, with rounded apex, and means, substantially as described, for locking the nut I K in place after it has been properly adjusted, whereby an open space is always left at the inner ends of the recesses in which the bearing parts H and K work, substantially as and for the purpose herein shown and specified.

In testimony that I claim the foregoing as my own I have hereunto affixed my signature in presence of two witnesses.

HORACE L. HEATON.

Witnesses:
HARRY GRANT KEMP,
ROBERT P. DUNCAN.